UNITED STATES PATENT OFFICE.

ROBERT ATHELSTAN MARR, OF BLACKSBURG, VIRGINIA.

PROCESS OF MAKING PAPER AND PRODUCT THEREOF.

1,046,475.  Specification of Letters Patent.  Patented Dec. 10, 1912.

No Drawing.  Application filed May 10, 1912. Serial No. 696,488.

*To all whom it may concern:*

Be it known that I, ROBERT A. MARR, of Blacksburg, in the county of Montgomery and in the State of Virginia, have invented a certain new and useful Improvement in Processes of Making Paper and Products Thereof, and do hereby declare that the following is a full, clear, and exact description thereof.

My invention relates particularly to a new method of making paper and product thereof, by means of which paper may be made out of any vegetable growth.

It has become a problem of paramount importance to find a substitute for wood and the other usual sources of paper pulp because of the rapid depletion and imminent disappearance of our forests and other present sources of paper making materials. Many plants cannot be used for paper making owing to the fact that the percentage of fibers is too small to make the separation of the fibers from the remainder of the materials in the plants profitable, or because of the fact that the fibers are too weak to produce a paper of the required strength, or because of the fact that no feasible method is known for the separation of the fibers from the remainder of the solid materials.

By means of my invention I am enabled to make paper commercially having the necessary characteristics of papers now in general use, and by the utilization of almost any vegetable growth. While my process is such as to render possible the use of any vegetable growth, I have found the following materials especially advantageous in making paper in accordance with my process: banana leaves, American papyrus or sedge, swamp grass, typha, weeds of various kinds, green or dry leaves of various kinds, cactus, liliaceae, cordage fibers, milkweed, California tule, sudd, waste vegetable materials, etc. In making paper in accordance with my invention, the entire solid content of the plant is utilized and the materials in the plant which might be a source of weakness, such as non-fibrous materials, are utilized in such a manner as to provide a strengthening element to the resulting paper. In this way I avoid the difficulty previously experienced in the separation of the fibers from the non-fibrous portions of plants, and I, furthermore, am enabled to utilize plants, the fibers of which were previously considered too weak to be used in paper making. My process is such, furthermore, that while the fibrous materials are bound together by the transformed non-fibrous materials, the resulting paper is maintained flexible by reason of the method of treatment. Furthermore, the resulting paper is of such a character that it requires little or no size as the transformed solid materials form both a filler and glaze which obviate the necessity of applying the usual filler and size. The resulting paper is also of such a nature that it is not affected by wood-decomposing fungi as the method of treatment not only sterilizes the paper stock, but renders the paper permanently antiseptic.

In carrying out my invention any process may be adopted in which the objects above referred to may be accomplished and particularly any process in which the non-fibrous solid materials of plants are utilized for forming a cementitious binder for the fibrous constituents of the plants, and any vegetable material may be used as a basis for the process with which the above results may be accomplished.

As an illustrative embodiment of my invention, however, I may proceed as follows: A quantity of green or dry banana leaves are comminuted as by chopping in any desired manner as, for example, in a grinding machine or shredder. The comminuted leaves, together with the liquid materials incidentally expressed in the grind operation are then boiled in a digester or other receptacle with the following solution: The solution is prepared by adding a quantity of chlorid of zinc to a body of water, the chlorid of zinc being kept in solution by the addition of a few drops of hydrochloric acid. To this solution of chlorid of zinc there is added a small quantity of glycerin and tannic acid. The comminuted vegetable materials are cooked in this solution preferably by boiling for a period of approximately thirty minutes. During this treatment the non-fibrous cellulose constituents of the leaves become transformed into a paste-like mass in the presence of the water. The paste-like mass which is probably amyloid, is utilized as a cementitious binder for the fibrous and other solid materials of the plant in the formation of the paper. The glycerin maintains this binder soft, so as to keep the resulting paper flexible. It is to be understood, however, that the glycerin is used only in the case where it is found desirable to produce paper requiring a softening agent. While the tannic acid may be omitted if desired, it is ordinarily used in order to render insoluble some constituents of the plant which would otherwise remain soluble. After the vegetable materials have been cooked in this manner, the moisture is removed by passing the liquid and insoluble materials through a press or centrifuge. The solution used may be recovered at this point for further use in paper making.

The solid materials thus obtained are then further comminuted and broken up by passing through a grinder or beating engine, the treatment being preferably effected in the presence of water. The watery mixture thus obtained is then transferred to a tank or other vessel for the bleaching operation. There may be instances in which it is desired to preserve the chlorophyll of the plant being treated, and in such cases the bleaching operation is omitted. When omitted, my process is such as to preserve the color of the chlorophyll indefinitely. In the process of making paper for most commercial uses, it is desirable, however, to remove the color of the vegetable materials and in such cases I submit the vegetable materials to bleaching agents of a kind found to be most desirable. The bleaching operation may, if desired, be effected by subjecting the watery mixture obtained from the grinding or beating engine to the action of sodium peroxid. The addition of the sodium perodix liberates a quantity of nascent oxygen which removes the greater part of the color, and the resulting alkali formed by the addition of the sodium peroxid has some effect in mercerizing the fibers. If the color is not entirely discharged by this treatment, the solid materials may be washed by one or more changes of washing water, and thereafter the vegetable materials may be subjected to the action of chlorid of lime or other similar strong bleaching agent. When the bleaching action has been completed, all traces of chlorid of lime and chlorin are removed in any desired manner, as by washing and neutralization, and if desired, the pulp may be subjected to a further grinding or beating in a grinding or beating engine of any desired character. The white pulp thus obtained is then run into a paper machine in which the pulp is filtered upon a wire screen, then dried and finally subjected to calendering rolls, to compress and glaze it. This completes the process of making the paper unless it is found desirable to add other steps such, for example, as sizing, filling, coloring, etc. If it is desired to add these or other steps to the process, they are carried out in the proper place in the paper making process.

The paper thus formed is of an even texture and is usually comprised of the fibrous parts of the plant interwoven and securely bound together by means of a cementitious binder formed from the non-fibrous constituents of the plant, and consisting probably of amyloid. This latter substance not only acts as a binder for the fibers, but acts as a filler and a sizing for the paper, so that the addition of no other filler or sizing becomes necessary. Although the fibers are, in this manner, effectively bound together, the resulting paper is very flexible and is rendered especially flexible, owing to the presence of glycerin added during the process. It is to be understood, also, that in the treatment of the vegetable materials which ofttimes contain an appreciable amount of oil, the treatment is such as to decompose the oil, liberating a quantity of glycerin. This glycerin has the effect of assisting in the softening. The presence of the tannic acid causes some of the soluble constituents to be rendered insoluble and by this means a larger percentage of paper making materials is obtained. In making paper in accordance with my process, from 98 to 99% of the solid constituents of the plant may be transformed into paper. Paper stock formed in accordance with my process is, furthermore, of such a nature that it will remain unaffected by any wood-decomposing fungi indefinitely. This is due probably to the retention by the paper of some of the zinc salts and some of the compounds formed by the tannic acid.

While I have described my invention above in detail, I wish it to be understood that many changes may be made therein without departing from the spirit of my invention.

I claim:

1. The process of making paper stock which comprises treating vegetable matter with a chlorid so as to change the more easily attackable carbohydrate constituents into a cementitious material to bind the remainder together.

2. The process of making paper stock which comprises treating vegetable matter with a chlorid so as to change the more easily attackable cellulose constituents into a cementitious material to bind the remainder together.

3. The process of making paper stock which comprises treating vegetable matter with zinc chlorid so as to change the more easily attackable carbohydrate constituents into a cementitious material to bind the remainder together.

4. The process of making paper stock which comprises treating vegetable matter with zinc chlorid so as to change the more easily attackable cellulose constituents into a cementitious material to bind the remainder together.

5. The process of making paper which comprises treating vegetable matter with zinc chlorid so as to change the more easily attackable carbohydrate constituents into a cementitious material to bind the remainder together, and then finishing the paper.

6. The process of making paper which comprises treating vegetable matter with zinc chlorid so as to change the more easily attackable cellulose constituents into a cementitious material to bind the remainder together, and then finishing the paper.

7. The process of making paper stock which comprises treating vegetable materials with zinc chlorid, glycerin and tannic acid.

8. The process of making paper which comprises treating vegetable matter with zinc chlorid so as to change the more easily attackable carbohydrate constituents into a cementitious material to bind the remainder together, comminuting it, bleaching it, making it into sheets and calendering it.

9. As an article of manufacture, paper stock comprising cellulose constituents cemented together by a material rendered cementitious by the action of zinc chlorid comprising the more easily attackable cellulose constituents.

In testimony that I claim the foregoing I have hereunto set my hand.

ROBERT ATHELSTAN MARR.

Witnesses:
W. H. BORDEN,
W. F. HENDERSON.